(12) United States Patent
Lam et al.

(10) Patent No.: US 8,781,322 B2
(45) Date of Patent: *Jul. 15, 2014

(54) MIGRATABLE WAVELENGTH DIVISION MULTIPLEXING PASSIVE OPTICAL NETWORK

(75) Inventors: Cedric F. Lam, Milpitas, CA (US); Hong Liu, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 141 days.

This patent is subject to a terminal disclaimer.

(21) Appl. No.: 13/205,055

(22) Filed: Aug. 8, 2011

(65) Prior Publication Data

US 2013/0039656 A1    Feb. 14, 2013

(51) Int. Cl.
*H04J 14/00* (2006.01)

(52) U.S. Cl.
USPC ............ 398/68; 398/66; 398/71; 398/72; 398/75; 398/100; 370/352; 370/392; 370/389; 370/468

(58) Field of Classification Search
USPC ........... 398/66, 67, 68, 69, 70, 71, 72, 79, 85, 398/87, 98, 99, 100, 75, 77, 76, 78, 82, 135, 398/136, 137, 138, 139, 73, 74; 370/352, 370/392, 389, 468, 401, 465, 503, 395.53, 370/432, 254

See application file for complete search history.

(56) References Cited

U.S. PATENT DOCUMENTS

| 5,218,664 | A | 6/1993 | O'Neill et al. |
| 5,699,176 | A | 12/1997 | Cohen |
| 5,926,298 | A | 7/1999 | Li |
| 6,009,220 | A | 12/1999 | Chan et al. |
| 6,434,313 | B1 | 8/2002 | Clapp, Jr. et al. |
| 6,778,752 | B2 | 8/2004 | Laporte et al. |
| 7,206,482 | B2 | 4/2007 | Rhyne et al. |
| 7,936,962 | B2 | 5/2011 | Mudd et al. |
| 8,320,760 | B1 * | 11/2012 | Lam et al. ............... 398/66 |

(Continued)

FOREIGN PATENT DOCUMENTS

EP    2 091 166 A1    8/2009

OTHER PUBLICATIONS

PCT/US2012/046537; PCT International Search Report and Written Opinion of the International Searching Authority, mailed Jan. 3, 2013, 10 pages.

(Continued)

*Primary Examiner* — Hanh Phan
(74) *Attorney, Agent, or Firm* — Foley & Lardner LLP; Edward A. Gordon

(57) ABSTRACT

A hybrid passive optical network ("PON") includes a time-division multiplexing ("TDM") optical line terminal ("OLT") and a wavelength-division multiplexing ("WDM") OLT. The TDM OLT communicates with a first group of customer premises ("CPs") via TDM signals while the WDM OLT communicates with a second group of CPs via WDM signals. A remote node power splitter is coupled to receive the TDM and WDM signals and broadcast both the TDM signals and the WDM signals on all of its ports facing towards the CPs. Optical filters are disposed between the remote node power splitter and the second group of CPs. Each optical filter is configured to pass a sub-group of the WDM signals while blocking other WDM signals such that each of the second group of CPs receives its own allocation of WDM signals but does not receive WDM signals allocated to other CPs of the second group of CPs.

25 Claims, 13 Drawing Sheets

(56) References Cited

U.S. PATENT DOCUMENTS

| | | | |
|---|---|---|---|
| 2002/0145775 A1 | 10/2002 | Effenberger et al. | |
| 2005/0175344 A1* | 8/2005 | Huang et al. | 398/79 |
| 2005/0207711 A1 | 9/2005 | Vo et al. | |
| 2006/0153565 A1 | 7/2006 | Park et al. | |
| 2006/0257148 A1* | 11/2006 | Hirth et al. | 398/71 |
| 2007/0206898 A1* | 9/2007 | Wang et al. | 385/24 |
| 2008/0267627 A1* | 10/2008 | Effenberger | 398/72 |
| 2009/0060521 A1 | 3/2009 | Lin et al. | |
| 2009/0162064 A1* | 6/2009 | Mizutani et al. | 398/66 |
| 2009/0202246 A1* | 8/2009 | Kashima | 398/77 |
| 2009/0263122 A1 | 10/2009 | Helkey et al. | |
| 2010/0054740 A1* | 3/2010 | Lee et al. | 398/68 |
| 2010/0142955 A1 | 6/2010 | Yu et al. | |
| 2010/0196011 A1 | 8/2010 | Liu et al. | |
| 2010/0232803 A1* | 9/2010 | Ji et al. | 398/149 |
| 2010/0290782 A1 | 11/2010 | Lee et al. | |
| 2011/0158650 A1* | 6/2011 | Cavaliere et al. | 398/79 |
| 2011/0182578 A1 | 7/2011 | Cavaliere | |
| 2011/0236017 A1 | 9/2011 | Ohlen | |
| 2011/0243552 A1* | 10/2011 | Mitchell et al. | 398/14 |
| 2011/0262131 A1 | 10/2011 | Gottwald et al. | |
| 2011/0268438 A1 | 11/2011 | Daems | |
| 2011/0274433 A1 | 11/2011 | Presi et al. | |

OTHER PUBLICATIONS

"Optical Network Management System, Remote Testing, Network Monitoring, and Service Provisioning Solution for High-Quality Network Performance", Retrieved from the internet: <http://www.jdsu.com/ProductLiterature/onms_br_fop_tm_ae.pdf>, 2005, 8 pages, JDSU Uniphase Corporation.

NetCracker, "Comprehensive Telecom Operations and Management Solutions, Product Overview", 2010, 2 pages, NetCracker Technology Corp.

"ONMS PON Centralized Remote PON Test System", <http://www.jdsu.com/product-literature/onmspon_br_fop_tm_ae.pdf>, Jun. 2009, 4 pages, JDSU Uniphase Corporation.

Hamacher, M. et al., "Coherent Receiver Front-End Module Including a Polarization Diversity Waveguide OIC and a High-Speed InGaAs Twin-Dual p-i-n Photodiode OEIC Both Based on InP," IEEE Photonics Technology Letters, vol. 4, No. 11, Nov. 1992, pp. 1234-1237.

"Homodyne detection", From Wikipedia, the free encyclopedia, <http://en.wikipedia.org/wiki/Homodyne_detection> retrieved from Internet on Jul. 11, 2011, 1 page.

Optical heterodyne detection, From Wikipedia, the free encyclopedia, <http://en.wikipedia.org/wiki/Optical_heterodyne_detection> retrieved from Internet on Jul. 11, 2011, 5 pages.

Lam, Cedric F., "Installation of Fiber-To-The-Premise Using Optical Demarcation Devices," U.S. Appl. No. 12/941,766, filed Nov. 8, 2010.

Lam, Cedric F., "Fiber Diagnosis System for Point-To-Point Optical Access Networks," U.S. Appl. No. 12/985,041, filed Jan. 5, 2011.

Lam, Cedric F., "Detection of Fiber Faults in Optical Fiber Networks," U.S. Appl. No. 13/040,983, filed Mar. 4, 2011.

* cited by examiner

MIGRATABLE WAVELENGTH DIVISION MULTIPLEXING PASSIVE OPTICAL NETWORK

TECHNICAL FIELD

This disclosure relates generally to optical networks, and in particular but not exclusively, relates to wavelength division multiplexing optical access networks and time division multiplexing access networks.

BACKGROUND INFORMATION

Fiber-to-the-home (FTTH) has been regarded as the ultimate form of broadband access offering very high bandwidth to end-users. Today's FTTH systems are mostly offered through point-to-multipoint time division multiplexed (TDM) passive optical networks (PONs) using a 1:N power splitter (e.g., Ethernet-PON, Gigabit-PON, and 10G versions of these systems) at a remote node (RN) in the field to share a common transceiver at the central office (CO), or through point-to-point (pt-2-pt) optical Ethernets with individual home-run fibers.

The upstream and downstream signals of a TDM-PON are transmitted using different optical wavelengths (usually 1310 nm for upstream transmission and 1490 nm for downstream transmission). The TDM-PON media access controller (MAC) within the CO schedules the transmission between the CO transceiver (TRX) and the end users by assigning appropriate time slots to each end user. A TDM-PON provides beneficial savings in the number of trunk fibers (between RN and CO) and optical transceiver counts at the CO while saving patch panel space to terminate fibers, but does not scale well with bandwidth growth. The bandwidth per household is often oversubscribed as the bandwidth per optical line terminal (OLT) TRX at the CO is shared among all optical network units (ONUs) connected to the given OLT TRX. To support Gb/s per user transmission speeds on a TDM-PON can require >10 Gb/s transceivers at each ONU. Thus, high-speed transmissions can be both technologically challenging and expensive.

Pt-2-pt optical networks provide very high bandwidths to end users, but do not scale well with optical fiber termination at the CO and fiber counts. Rather, pt-2-pt optical networks result in large numbers of trunk lines and transceivers and fiber terminations in the CO. This usually results in greater space requirements, higher power, and increased capital expenses.

A wavelength division multiplexed (WDM) PON is another approach, which provides the benefit of fiber consolidation and pt-2-pt virtual links to end-users by assigning separate wavelengths between the CO and individual users. It can offer the benefits of both pt-2-multipoint TDM-PON and pt-2-pt architectures. Traditional WDM-PON systems use a wavelength demultiplexer (as opposed to the power splitter used in TDM-PON) at the RN in the field to distribute a separate wavelength to end-users. To upgrade a conventional TDM-PON to a WDM-PON currently involves replacing the power splitter in the RN with the wavelength multiplexer and replacing all TDM-ONUs at user premises with WDM-ONUs. This all or nothing upgrade is a sort of fork-lifting upgrade that is not only cumbersome but also disruptive to current subscribers and difficult to coordinate. In addition, current WDM wavelength-multiplexers fix the wavelength spacing and optical spectrum at deployment time and constrain future spectral flexibility. In other words, conventional WDM-PON systems use a fixed wavelength plan, which is difficult to change after deployment.

Despite its promise, WDM-PON technologies are still maturing and have not yet achieved mainstream adoption. As such, it is important to have a migration strategy to upgrade TDM-PON to WDM-PON systems seamlessly with minimum disruption to the existing TDM-PON users. Such a system should support coexistence of TDM-PON and WDM-PON architectures during the migration period.

BRIEF DESCRIPTION OF THE DRAWINGS

Non-limiting and non-exhaustive implementations of the invention are described with reference to the following figures, wherein like reference numerals refer to like parts throughout the various views unless otherwise specified.

DETAILED DESCRIPTION

Implementations of a system and technique for implementing a hybrid passive optical network ("PON") that multiplexes wavelength division multiplexing ("WDM") signals and time division multiplexing ("TDM") signals over a single fiber plant infrastructure are described herein. In the following description numerous specific details are set forth to provide a thorough understanding of the implementations. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one implementation" or "an implementation" means that a particular feature, structure, or characteristic described in connection with the implementation is included in at least one implementation of the present invention. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

Fiber-to-the-home ("FTTH") is a broadband access network infrastructure. One option for implementing an FTTH access network uses a point-to-multipoint passive optical network ("PON") architecture. A point-to-multipoint PON optical network that uses unpowered or passive optical splitters/multiplexers to enable one or two fibers to serve multiple customer premises ("CPs") (e.g., 32 to 128 customer premises). Another option for FTTH is to string a separate homerun fiber from a carrier central office ("CO") all the way to each CP. Such architecture is called a point-2-point architecture (pt-2-pt) as opposed to point-to-multipoint architecture.

Figure 1:
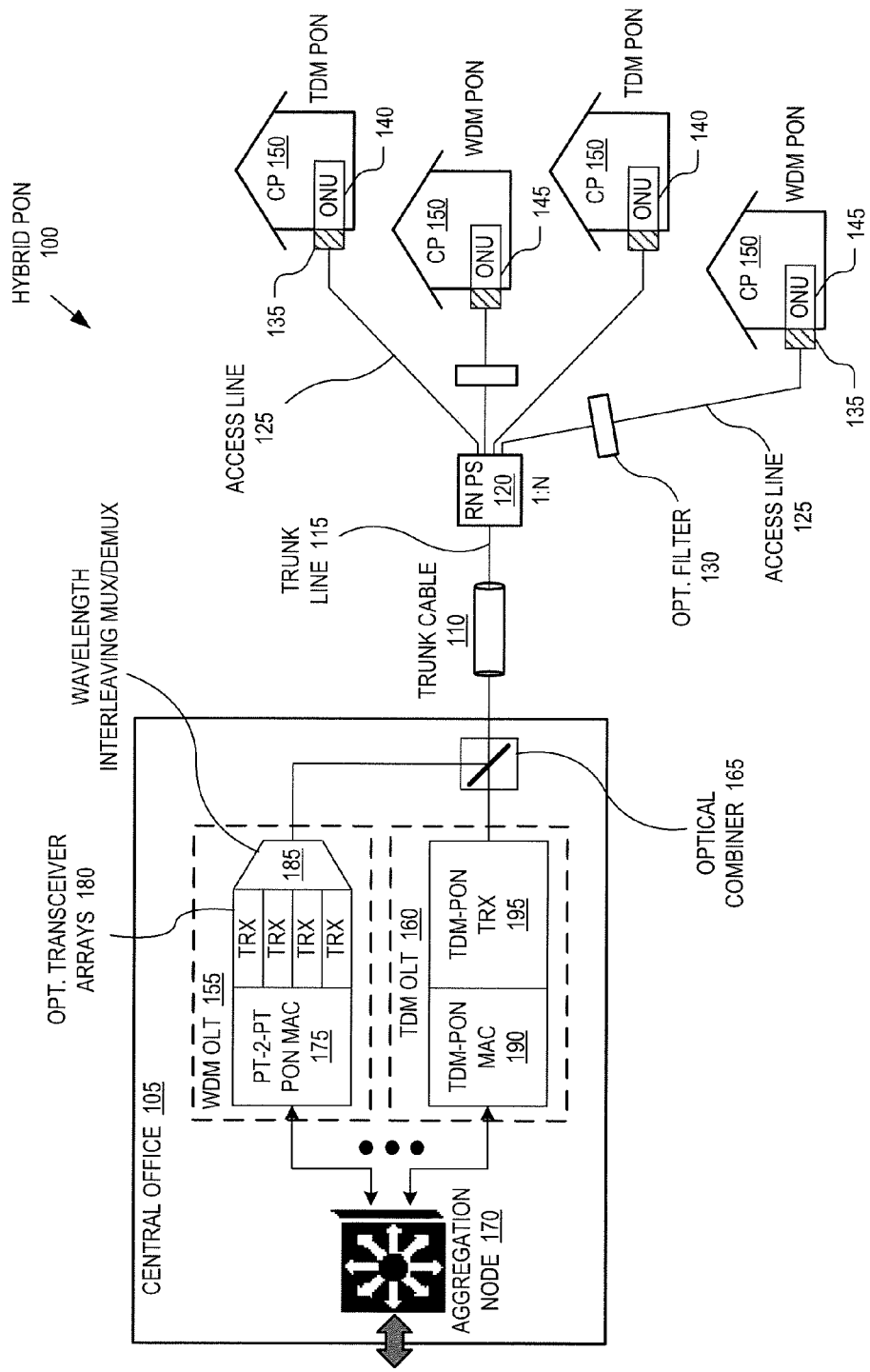
FIG. 1 is a functional block diagram illustrating a hybrid passive optical network ("PON"), in accordance with an implementation of the disclosure.

FTTH deployment is so capital intensive that many broadband access infrastructure providers are feverishly looking for methods to lower the deployment cost and migration from existing PON technologies (e.g., TDM-PON) to more advanced PON technologies (e.g., WDM-PON). FIG. 1 is a functional block diagram illustrating a hybrid PON 100 capable of facilitating a seamless migration from an existing TDM-PON access network infrastructure to a WDM-PON access network infrastructure, in accordance with an implementation of the disclosure. Hybrid PON 100 is capable of concurrently servicing TDM optical network units ("ONU") and WDM ONUs over a single fiber trunk line and remote node ("RN") power splitter. Hybrid PON 100 facilitates a virtually seamless transition from TDM-PON architecture to WDM PON architecture. Existing TDM CPs can continue to operate using their existing customer premise equipment (e.g., TDM ONUs), while new CPs can be added and given advanced WDM ONUs. The two technologies can be operated concurrently within hybrid PON 100 indefinitely or until such time as the conventional TDM ONUs are swapped out in a controlled and organized manner that limits disruptions to existing end-users and provides timing flexibility.

The illustrated implementation of hybrid PON 100 includes a CO 105, a trunk cable 110, a trunk line (or trunk fiber strand) 115 inside the trunk cable 110, and a RN power splitter 120, access lines 125, optical filters 130, demarcation points 135, and TDM ONUs 140 and WDM ONUs 145 at CPs 150. The illustrated implementation of CO 105 includes a WDM optical line terminal ("OLT") 155, a TDM OLT 160, an optical combiner 165, and an aggregation node 170. The illustrated implementation of WDM OLT 155 includes a pt-2-pt PON media access controller ("MAC") 175, an optical transceiver array 180, and a wavelength interleaving multiplexer/demultiplexer ("MUX/DEMUX") 185. The illustrated implementation of TDM OLT 160 includes a TDM-PON MAC 190 and a TDM-PON transceiver 195.

Trunk line 115, RN PS 120, and access lines 125 that couple to WDM ONUs 145 may be considered to make up a WDM PON or WDM sub-PON, while the trunk line 115, RN PS 120, and access lines 125 that coupled to TDM ONUs 140 may be considered to make up a TDM PON or TDM sub-PON, and collectively trunk line 115, RN PS 120 and all access lines 125 may be referred to as a hybrid PON. WDM OLT 155 and TDM OLT 160 serve as the service provider's endpoint at CO 105 for their respective sub-PONs. Each OLT serves two primary functions: 1) performing optical-to-electrical and electrical-to-optical conversions between the service provider's equipment and their respective sub-PON and 2) coordinating multiplexing with the ONUs at the other end of their respective sub-PONs. Of course, WDM OLT 155 performs wavelength division multiplexing between ONUs 145 and TDM OLT 160 performs time division multiplexing between ONUs 140. Each WDM OLT 155 and TDM OLT 160 may service a number of CPs 150 (e.g., 32, 64, 128, etc.) while a single CO 105 may services thousands of CPs 150 (e.g., 50,000). Thus, while FIG. 1 illustrates CO 105 as including just one WMD OLT 155 and one TDM OLT 160, in practice, CO 105 may include many paired WDM OLTs 155 and TDM OLTs 160 with their respective MACs 175 or 190 multiplexed via aggregation node 170.

Trunk cable 110 including trunk fiber strand 115 extends from CO 105 to RN power splitter 120 located within a neighborhood of CPs 150, which represent potential or existing customers of the service provider. From RN power splitter 120, individual fiber access lines 125 extend to corresponding CPs 150. Access lines 125 may be terminated at demarcation points 135. The demarcation point 135 may be located on a side of the CP where the fiber access line enters the building or in an access box or hand hole near the customer's property line (e.g., in a utility right-of-way). Demarcation points 135 provide a well-defined demarcation identification point between the customer premise equipment ("CPE") including TDM ONU 140 and/or WDM ONU 145 and the carrier's fiber plant. Demarcation points 135 may serve to demark the terminal point of maintenance responsibility for the carrier. Both trunk cable 110 and access lines 125 may run along a utility right-of-way running adjacent to a neighborhood street. Trunk cable 110 and access lines 125 may be a subterranean fiber plant, a suspended fiber plant (e.g., suspended along telephone poles), or otherwise.

ONUs 140 and 145 serve as the CPE endpoint at CPs 150 and perform the primary function of performing optical-to-electrical and electrical-to-optical conversions. ONUs 140 and 145 link to a paired set of WDM OLT 155 and TDM OLT 160 at CO 105 via a single RN power splitter 120, trunk fiber strand 115 and optical combiner 165. All downstream signals (signals propagating along the optical direction extending from CO to CP) received from both WDM OLT 155 and TDM OLT 160 are broadcast on all downstream facing ports of RN power splitter 120 towards CPs 150. All upstream signals (signals propagating along the optical direction extending from CP to CO) received from either TDM ONUs 140 or WDM ONUs 145 are combined by RN power splitter 120 onto a single upstream facing port for delivery to CO 105 via trunk fiber strand 115 and optical combiner/splitter 165. Upstream facing ports are ports that send signals to or receive signals from a signal path(s) propagating towards aggregation node 170 in CO 105. Downstream facing ports are ports that send signals to or receive signals from the signal path(s) propagating towards CPE at CPs 150. As discussed in further detail below, each access line 125 linked to a WDM ONU 145 includes an optical filter 130 disposed anywhere between the downstream port of RN power splitter 120 and demarcation point 135. Since the WDM signals support virtual pt-2-pt links, each optical filter 130 includes a unique optical passband that only passes the WDM signals designated for the given CP 150. Since the TDM signals are time multiplexed broadcast signals, each TDM ONU 140 includes the same optical filter as other TDM ONUs 140 that passes the upstream and downstream TDM wavelengths (typically 1310 nm upstream and 1490 nm downstream).

Figure 2A:
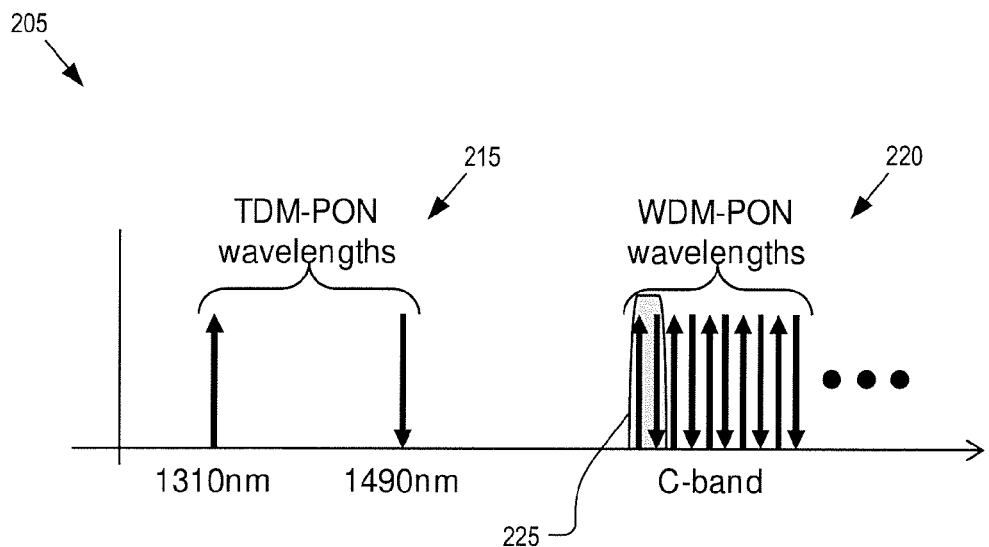
FIG. 2A is a chart illustrating time division multiplexing ("TDM") PON wavelengths and wavelength division multiplexing ("WDM") PON wavelengths of a hybrid PON, in accordance with an implementation of the disclosure.

FIG. 2A is a chart 205 illustrating an example wavelength allocation or hybrid PON wavelength grid for the TDM and WDM signals. It should be appreciated that FIG. 2A is merely demonstrative and other wavelengths or bands may be allocated to the TDM and WDM signals than those illustrated. The TDM signals are allocated according to a TDM-PON wavelength grid 215 while the WDM signals are allocated according to a WDM-PON wavelength grid 220. As illustrated, TDM-PON wavelength grid 215 includes just two wavelengths—an upstream wavelength and a downstream wavelength. The downstream wavelength is broadcast to all TDM ONUs 140. In contrast, the WDM-PON wavelength grid 220 includes many upstream and downstream wavelengths (e.g., 32 upstream wavelengths and 32 downstream wavelengths having a 50 GHz wavelength spacing between upstream and downstream wavelengths, and 100 GHz wavelength spacing between neighboring upstream or neighboring downstream wavelengths). The WDM-PON wavelength grid 220 allocates the wavelengths such that consecutive communication wavelengths are alternatively assigned between downstream and upstream WDM signals. In one implementation, the WDM-PON wavelength grid 220 is further allocated such that each WDM ONU 145 is allocated adjacent communication wavelengths. For example, adjacent upstream/downstream wavelengths 225 may be allocated to a single CP 150. Of course, a single CP 150 may be allocated additional bandwidth by allocating more than a block of two communication wavelengths (e.g., by allocating 4, 6, etc.).

Figure 2B:
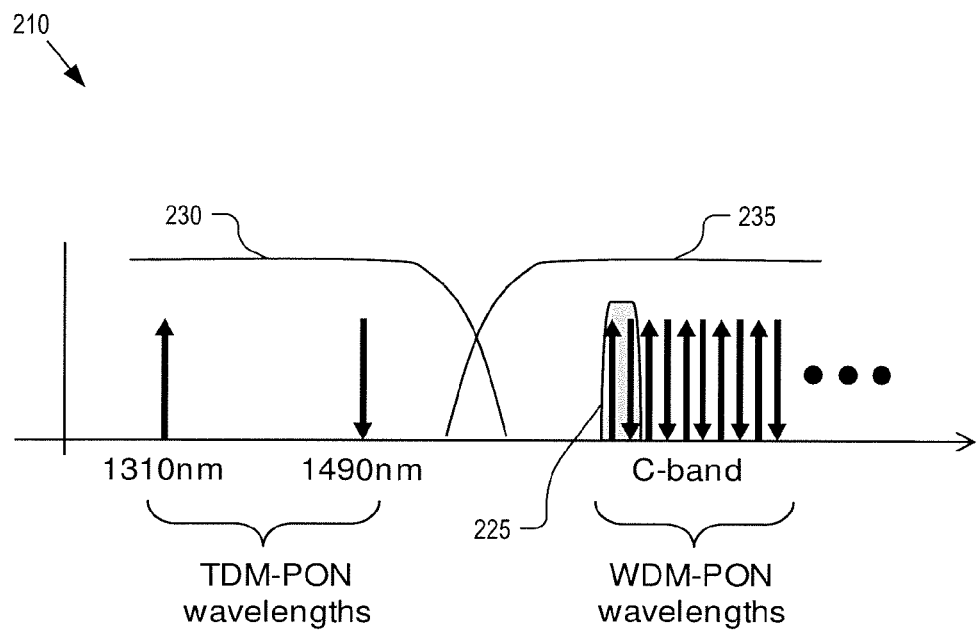
FIG. 2B is a chart illustrating pass-bands of an optical combiner, in accordance with an implementation of the disclosure.

In the implementation of FIG. 1, the TDM and WDM signals are delivered to RN power splitter 120 over a single trunk fiber strand 115. As such, an optical combiner 165 is located at the CO 105 to combine the TDM and WDM signals arriving at and departing from the WDM OLT 155 and TDM OLT 160. FIG. 2B is a chart 210 illustrating pass-bands of optical combiner 165, in accordance with an implementation of the disclosure. In the illustrated implementation, optical combiner 165 is a band combiner that includes a first passband 230 for directing TDM signals and a second pass-band 235 for directing WDM signals. TDM signals that fall within pass-band 230 are permitted to pass through optical combiner 165 in either the upstream or downstream direction to travel between TDM OLT 160 and trunk fiber strand 115. Conversely, downstream WDM signals that fall within pass-band 235 are coupled into trunk fiber strand 115 in the downstream direction and upstream WDM signals within pass-band 235 are separated from the TDM signals and reflected towards WDM OLT 155. In one implementation, optical combiner 165 is implemented using a dichroic filter that is substantially transparent in pass-band 230 and substantially reflective in pass-band 235. In another implementation, optical combiner 165 is substantially reflective in pass-band 230 and substantially transparent in pass-band 235.

Figures 3A, 3B:
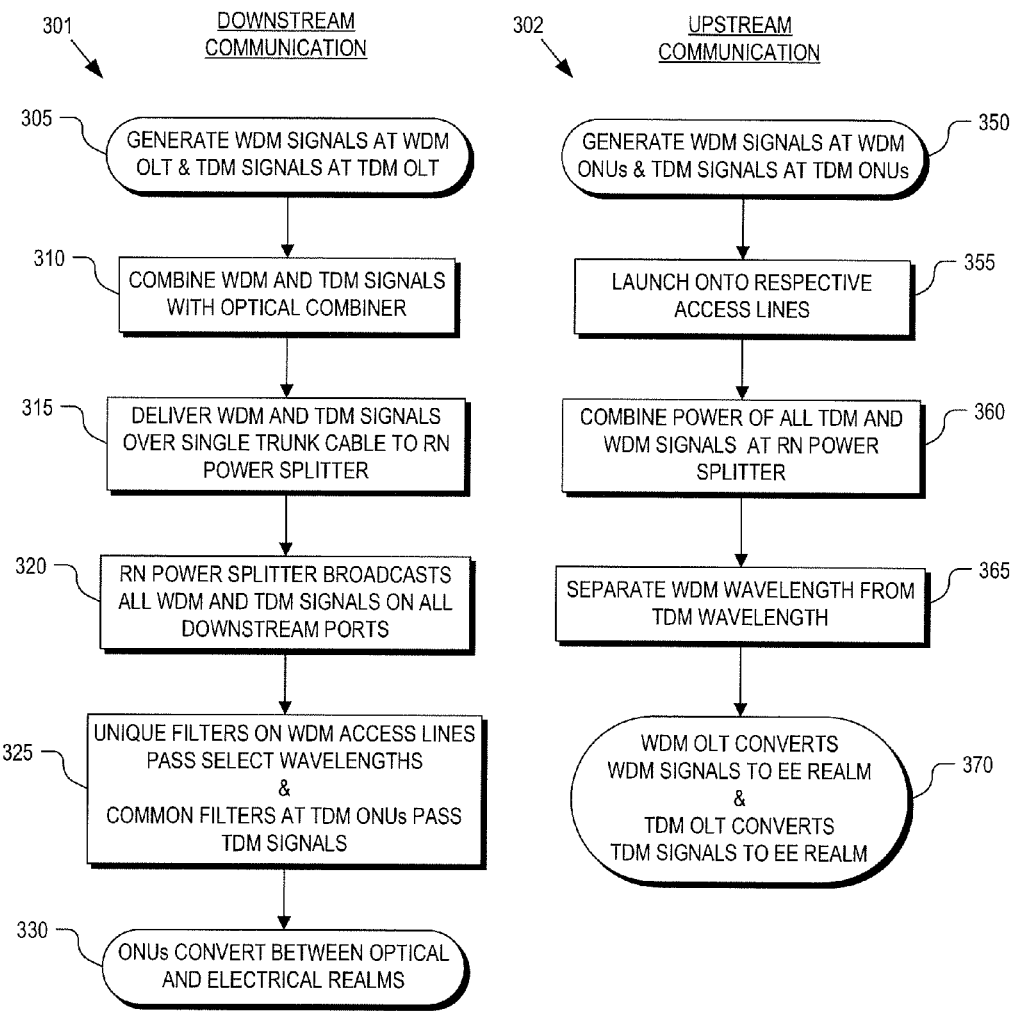
FIGS. 3A & 3B are flow charts illustrating a process of operating a hybrid PON including TDM ONUs and WDM ONUs, in accordance with an implementation of the disclosure.

FIGS. 3A & 3B are flow charts illustrating processes of operation of hybrid PON 100, in accordance with an implementation of the disclosure. FIG. 3A illustrates a process 301 for downstream flowing communications, while FIG. 3B illustrates a process 302 for upstream flowing communications. The order in which some or all of the process blocks appear in process 301 or 302 should not be deemed limiting. Rather, one of ordinary skill in the art having the benefit of the present disclosure will understand that some of the process blocks may be executed in a variety of orders not illustrated, or in parallel.

In a process block 305, each OLT within CO 105 receives electrical signals from their respective MACs (e.g., pt-2-pt PON MAC 175 or TDM-PON MAC 190) and generates optical signals for launching into their respective sub-PONs. For example, WDM OLT 155 generates WDM signals (discussed in greater detail below in connection with FIG. 5) while TDM OLT 160 generates TDM signals. In a process block 310, optical combiner 165 combines the downstream WDM signals on WDM-PON wavelength grid 220 with the downstream TDM signal from TDM-PON wavelength grid 215 on trunk fiber strand 115. Trunk fiber strand 115 guides the downstream WDM and TDM signals from CO 105 to RN power splitter 120 (process block 315). In one implementation, RN power splitter 120 is a passive optical element that splits the power of the downstream optical signals received on its upstream port across all of its downstream optical ports. Thus, in a process block 320, RN power splitter 120 broadcasts all the downstream signals onto all of its downstream facing optical ports. In other words, both the downstream TDM signal and the downstream WDM signals are broadcast onto all downstream facing optical ports of RN power splitter 120.

Since the downstream WDM signals each support a virtual pt-2-pt link between CO 105 and WDM ONUs 145, unique WDM optical filters (e.g., optical filters 130) are provided on a per CP 150 basis for linking to CO 105 via a WDM-PON (process block 325). Thus, each optical filter 130 is different from the other optical filters 130 and configured to provide a filter function that passes just the WDM signals (downstream & upstream) allocated to the particular CP 150 and its associated WDM ONU 145. In other words, each optical filter 130 passes a unique set of wavelengths so that each WDM ONU 145 receives its own allocation of the downstream WDM signals. Since each WD ONU 145 is assigned consecutive and adjacent wavelengths from WDM-PON wavelength grid 220, optical filters 130 may be implemented as optical narrowband filters. Optical filters 130 may be positioned anywhere between the downstream port of RN power splitter 120 and the optical port of WDM ONUs 145. However, for logistical maintenance and security reasons, it may be advantageous to position optical filters 130 upstream of demarcation points 135 (within the control of the service provider) and even positioned at the downstream ports of RN power splitter 120 between access lines 125 and RN power splitter 120.

Correspondingly, since the downstream TDM signal is inherently a point-to-multipoint broadcast signal, a common TDM optical filter (not illustrated) is provided for all TDM ONUs 140 to pass the downstream TDM signal (process block 325). The common TDM optical filter is configured to pass the downstream (and upstream) TDM signal, but block all WDM-PON signals. The common TDM optical filters may also be positioned anywhere between TDM ONUs 140 and the downstream ports of RN power splitter 120; however, these filters are typically included within the TDM ONUs 140. Of course, in some implementations, the unique WDM optical filters 130 and the common TDM optical filters may further be configured to pass an out-of-band optical service channel (OSC) with a different wavelength for diagnostic and other service related functions.

In a process block 330, the respect WDM ONUs 145 and TDM ONUs 140 receive and convert the downstream optical signals from the optical realm into the electrical realm for use by CPE.

Upstream communications are now described in connection with process 302 (FIG. 3B). In a process block 350, each individual CP 150 generates upstream data signals. For CPs 150 having a WDM ONU 145, the upstream data signals are converted to the optical realm and wavelength multiplexed onto the upstream wavelength allocated to the particular CP 150 by the user's WDM ONU 145. Accordingly, WDM ONUs 145 should be capable of outputting upstream optical signals on the particular wavelength allocated to the user's upstream traffic, as allocated from the WDM-PON wavelength grid 220 (discussed in greater detail below in connection with FIG. 6). For CPs 150 having a TDM ONU 140, the upstream data signals are converted to the optical realm, and signals from different TDM ONUs 140 are time multiplexed (scheduled) onto the upstream TDM wavelength by TDM OLT 160. The optical upstream TDM and WDM signals are launched into access lines 125 (process block 355).

The upstream TDM and WDM signals are delivered to RN power splitter 120 via their respective access lines 125. In a process block 360, the optical power of each of these upstream signals is combined onto trunk fiber strand 115. Accordingly, RN power splitter 120 operates as a power combiner in the upstream direction.

The combined TDM and WDM signals are delivered to CO 105 along trunk fiber strand 115. At CO 105, optical combiner 165 operates to de-multiplex the upstream TDM signal from the upstream WDM signals (process block 365). In the illustrated implementation, the WDM signals are separated from the TDM signal and reflect towards WDM OLT 155, while the TDM signal passes through optical combiner 165 towards TDM OLT 160. Of course, in another implementation, the pass-bands of optical combiner 165 may be configured such that the WDM signals pass through optical combiner 165 while the TDM signals are reflected.

Finally, in a process block 370, WDM OLT 155 de-multiplexes the individual upstream WMD signals and converts them the electrical realm. Similarly, TDM OLT 160 converts the upstream TDM signal to the electrical realm.

Figure 4:
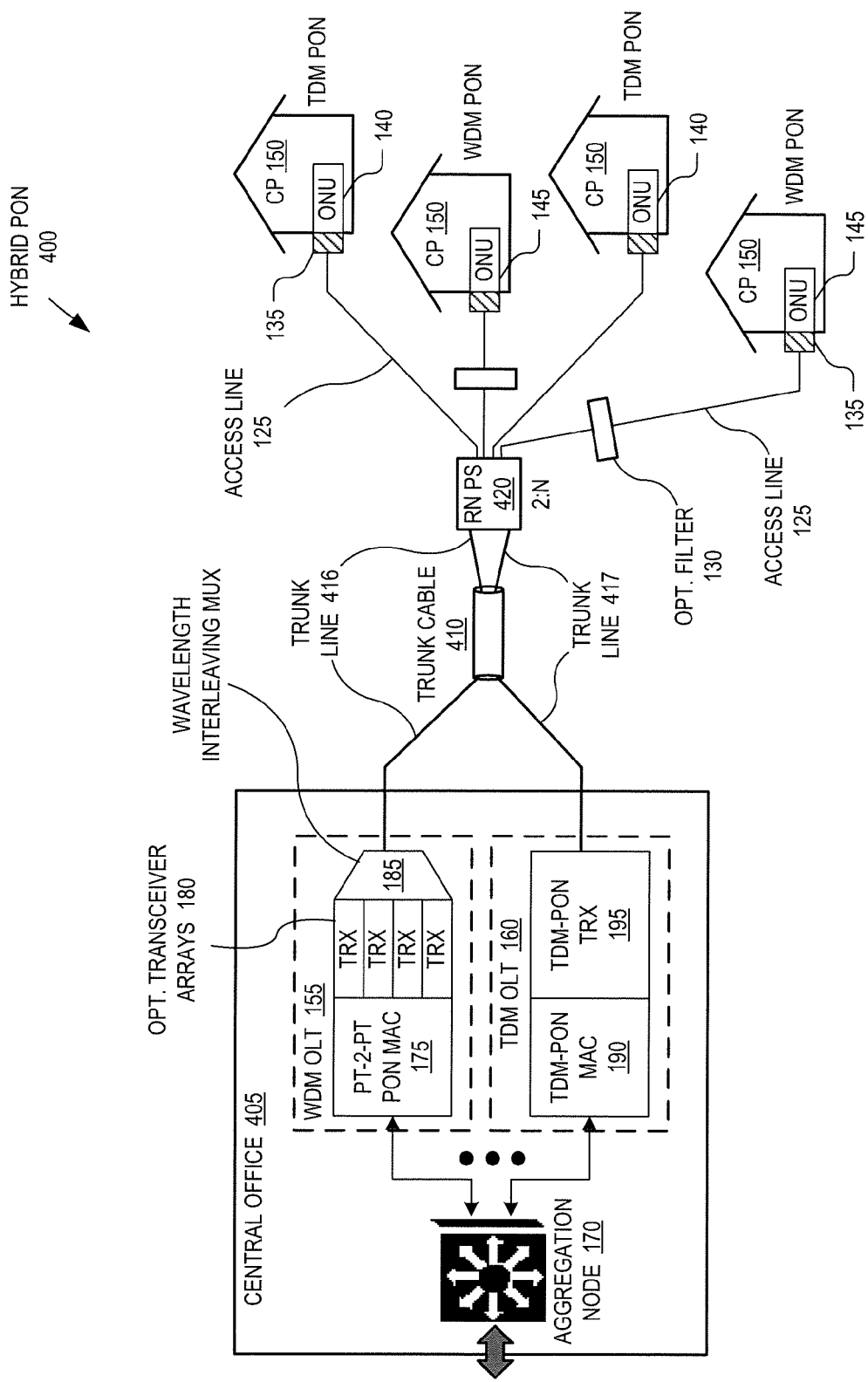
FIG. 4 is a functional block diagram illustrating a hybrid PON implemented with a 2:N remote node power splitter, in accordance with an implementation of the disclosure.

FIG. 4 is a functional block diagram illustrating a hybrid PON 400 implemented with a 2:N RN power splitter 420, in accordance with an implementation of the disclosure. Hybrid PON 400 is similar to hybrid PON 100 with the following exceptions. Hybrid PON 400 is implemented with a 2:N RN power splitter 420 instead of a 1:N RN power splitter 120. By using a 2:N power splitter, two fiber trunk lines 416 and 417 are run to RN power splitter 420. Trunk line 416 links WDM OLT 155 to a first upstream port of RN power splitter 420 while the second trunk line 417 links TDM OLT 160 to a second upstream port of RN power splitter 420. While two trunk lines must be run between CO 405 and RN power splitter 420 within trunk cable 410 per pair of WDM OLT 155 and TDM OLT 160, this configuration avoids the need for optical combiner 165 by paying the penalty of doubling the fiber counts of trunk fiber 410. Both RN power splitter 120 and RN power splitter 420 may be implemented using a passive planar lightwave circuit ("PLC"); however, in the case of RN power splitter 120 the PLC is a 1:N optical device while in the case of RN power splitter 420 the PLC is a 2:N optical device.

Figure 5A:
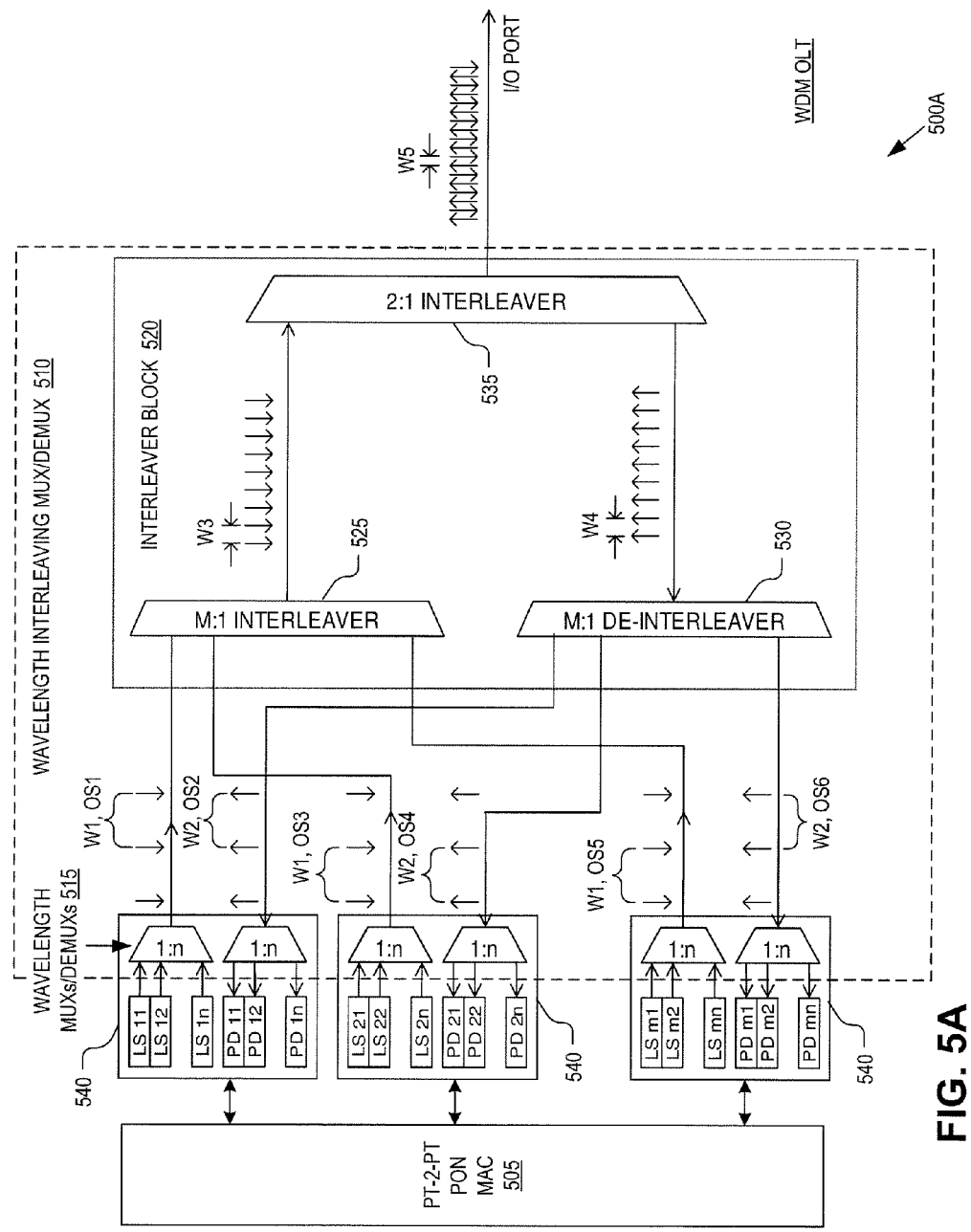
FIGS. 5A-F are functional block diagrams illustrating various WDM optical line terminals of a hybrid PON, in accordance with implementations of the disclosure.

FIG. 5A is a functional block diagram illustrating a WDM OLT 500A, in accordance with an implementation of the disclosure. WDM OLT 500A is one possible implementation of WDM OLT 155 illustrated in FIG. 1. The illustrated implementation of WDM OLT 500A includes a pt-2-pt PON MAC 505, arrays of laser sources LSs (e.g., laser diodes), arrays of photo-detectors PDs (e.g., photodiodes), and a wavelength interleaving MUX 510. The illustrated implementation of wavelength interleaving MUX 510 includes wavelength MUXs/DEMUXs 515 and an interleaver block 520. The illustrating implementation of interleaver block 520 includes an interleaver 525, a de-interleaver 530, and an interleaver 535. In one implementation, interleaver 535 is implemented as a diplexer.

The LS arrays, the PD arrays and optical mux's/demux's 515 may be physically integrated into dense WDM ("DWDM") transceiver modules 540 such that each transceiver module 540 includes a number of LSs (e.g., 10 to 20), a number of LDs (e.g., 10 to 20), and one pair of wavelength MUX 515 and wavelength DEMUX 515. In one implementation, the LS arrays and PD arrays are integrated into discrete transceiver modules while the wavelength MUX/DEMUXs 515 are externally coupled to the transceiver modules. The size of each transceiver module 540 is typically driven by the number of feeding electrical signal pins and the size of the pair of wavelength MUX/DEMUX 515. Wavelength MUX 515 and wavelength DEMUX 515 can be implemented using arrayed waveguide grating ("AWG") or other optical grating structures. By increasing the channel spacing between the adjacent wavelengths multiplexed/demultiplexed by a given AWG structure, the corresponding AWG structure can be reduced in physical size. Accordingly, in one implementation, transceiver modules 540 are implemented such that the channel spacing W between LSs or PDs multiplexed/demultiplexed by a given wavelength MUX/DEMUX 515 is larger than that of WDM-PON wavelength grid 220. Interleaver block 520 is then used to interleave the transceiver modules 540 in a manner that achieves the smaller channel spacing of WDM-PON wavelength grid 220. For example, channel spacing W1 of each LS array may have a 400 GHz wavelength spacing, the channel spacing W2 of each PD array may also have a 400 GHz but offset (OS) with respect to the LS array by +50 GHz. When interleaver block 520 interleaves 4 combs of 400 GHz spaced downstream wavelengths, a final spacing W3 of (e.g. 100 GHz) is achieved, which has a closer spacing than the W1 module channel spacing. Similarly, interleaver block 520 may interleave the upstream wavelengths such that upstream signal channel spacing W4 is also 100 GHz. Finally, interleaver 535 interleaves the downstream and upstream wavelengths such that the final upstream and downstream channel space W5 matches that of the WDM-PON wavelength grid 220 (e.g., 50 GHz). To achieve this, each transceiver module 540 has different respective offsets OS (e.g., OS1, OS2 . . . OS6) associated with the upstream and downstream WDM signals it multiplexes/de-multiplexes. Accordingly, in one implementation: W1=W2, W3=W4, W1>W3>W5.

Integrating the LS and PD arrays into a monolithic or hybrid photonic transceiver device provides additional benefits. For example, the transceivers can use the integrated driving electronics (laser drivers, transimpedance amplifiers) and share the same temperature controller and control circuitry so that total cost and power consumption may be reduced.

Figure 5B:
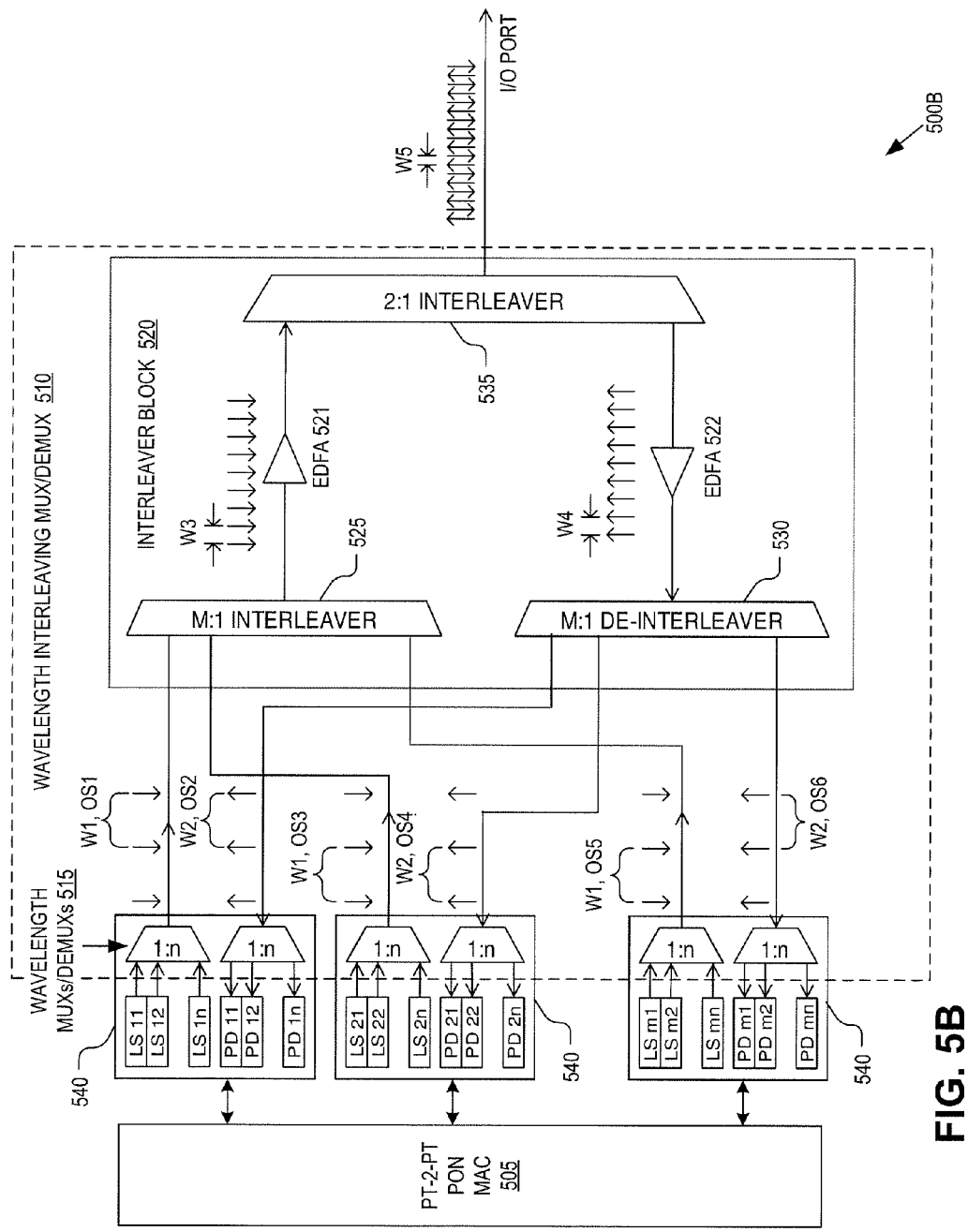

FIG. 5B is a functional block diagram illustrating a WDM OLT 500B, in accordance with an implementation of the disclosure. WDM OLT 500B is one possible implementation of WDM OLT 155 illustrated in FIG. 1. WDM OLT 500B is similar to WDM OLT 500A, except that interleaver block 520 includes an Erbium Doped Fiber Amplifier ("EDFA") 521 disposed in the downstream path between M:1 interleaver 525 and 2:1 interleaver 535 and an EDFA 522 disposed in the upstream path between 2:1 interleaver 535 and M:1 de-interleaver 530. EDFAs 521 and 522 improve the downstream and upstream optical power budgets, respectively.

Figure 5C:
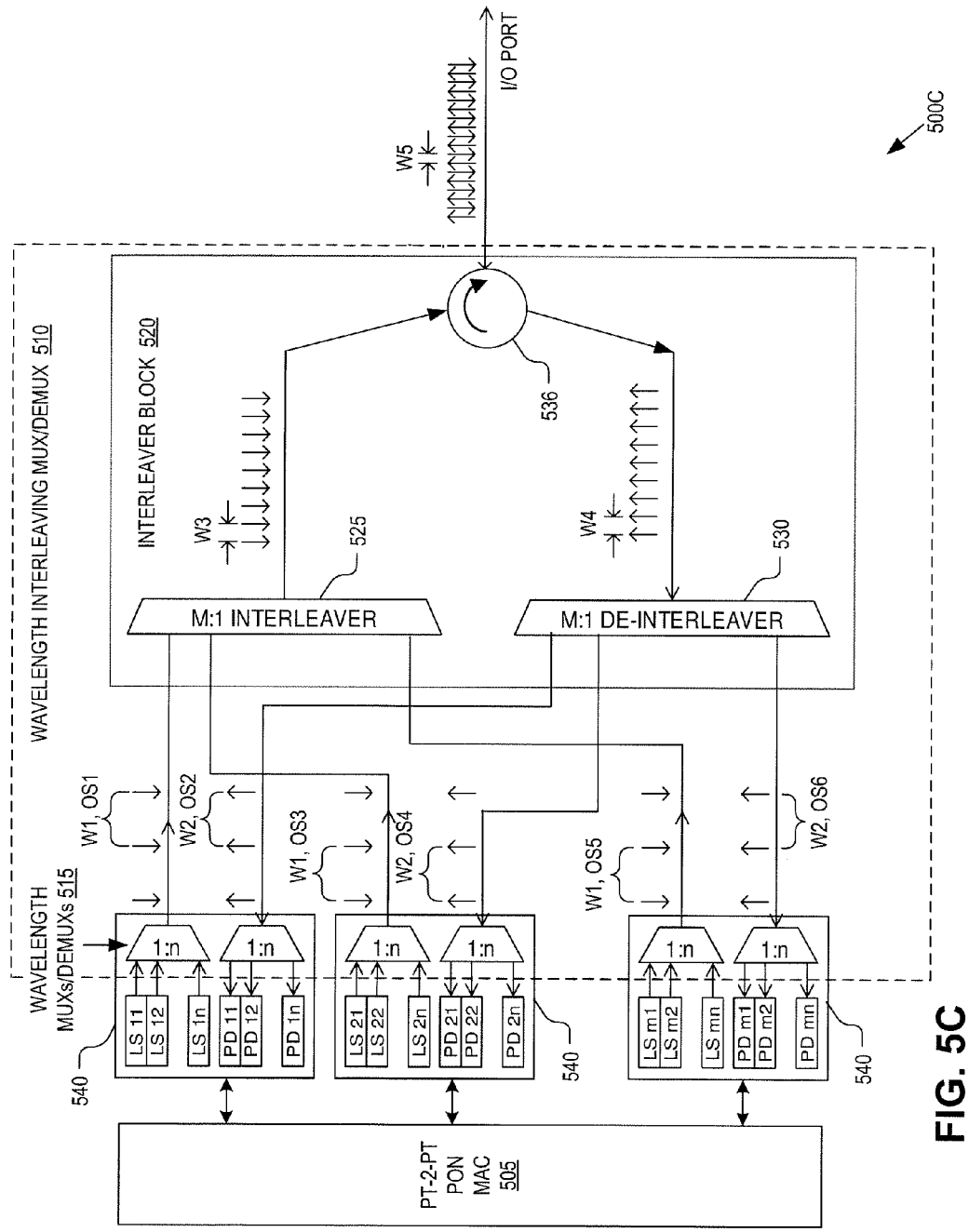

FIG. 5C is a functional block diagram illustrating a WDM OLT 500C, in accordance with an implementation of the disclosure. WDM OLT 500C is one possible implementation of WDM OLT 155 illustrated in FIG. 1. WDM OLT 500C is similar to WDM OLT 500A, except that the functionality of 2:1 interleaver 535 within interleaver block 520 is implemented using an optical circulator 536 having three ports—the first port of optical circulator 536 is coupled to M:1 interleaver 525, the second port of optical circulator 536 is coupled to the I/O port, and the third port of optical circulator 536 is coupled to M:1 de-interleaver 530.

Figure 5D:
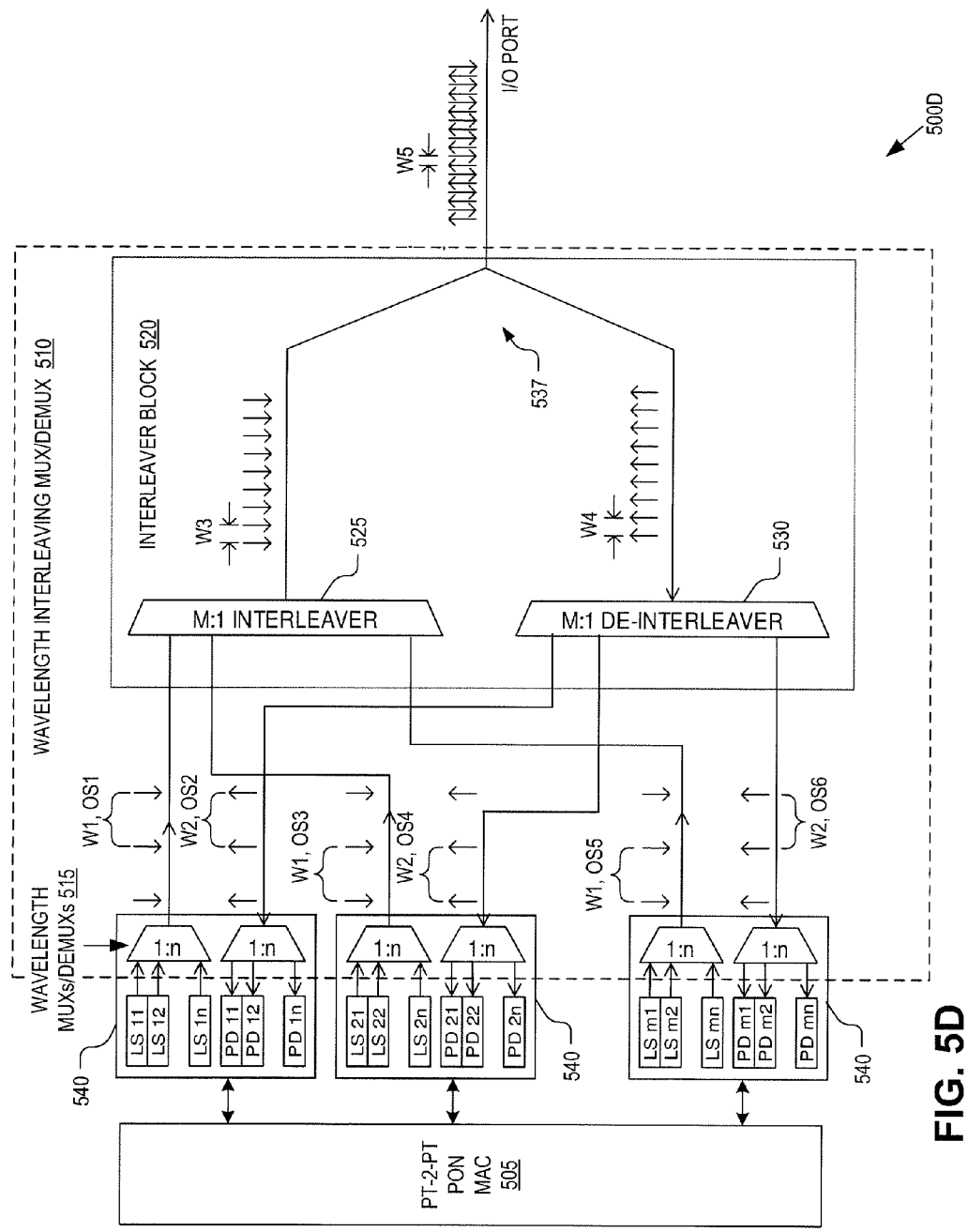

FIG. 5D is a functional block diagram illustrating a WDM OLT 500D, in accordance with an implementation of the disclosure. WDM OLT 500D is one possible implementation of WDM OLT 155 illustrated in FIG. 1. WDM OLT 500D is similar to WDM OLT 500A, except that the functionality of 2:1 interleaver 535 within interleaver block 520 is implemented using a 2:1 optical power splitter 537 having three ports—a common port coupled to the I/O port, a first input port coupled to M:1 interleaver 525, and a second input port coupled to M:1 de-interleaver 530.

Figure 5E:
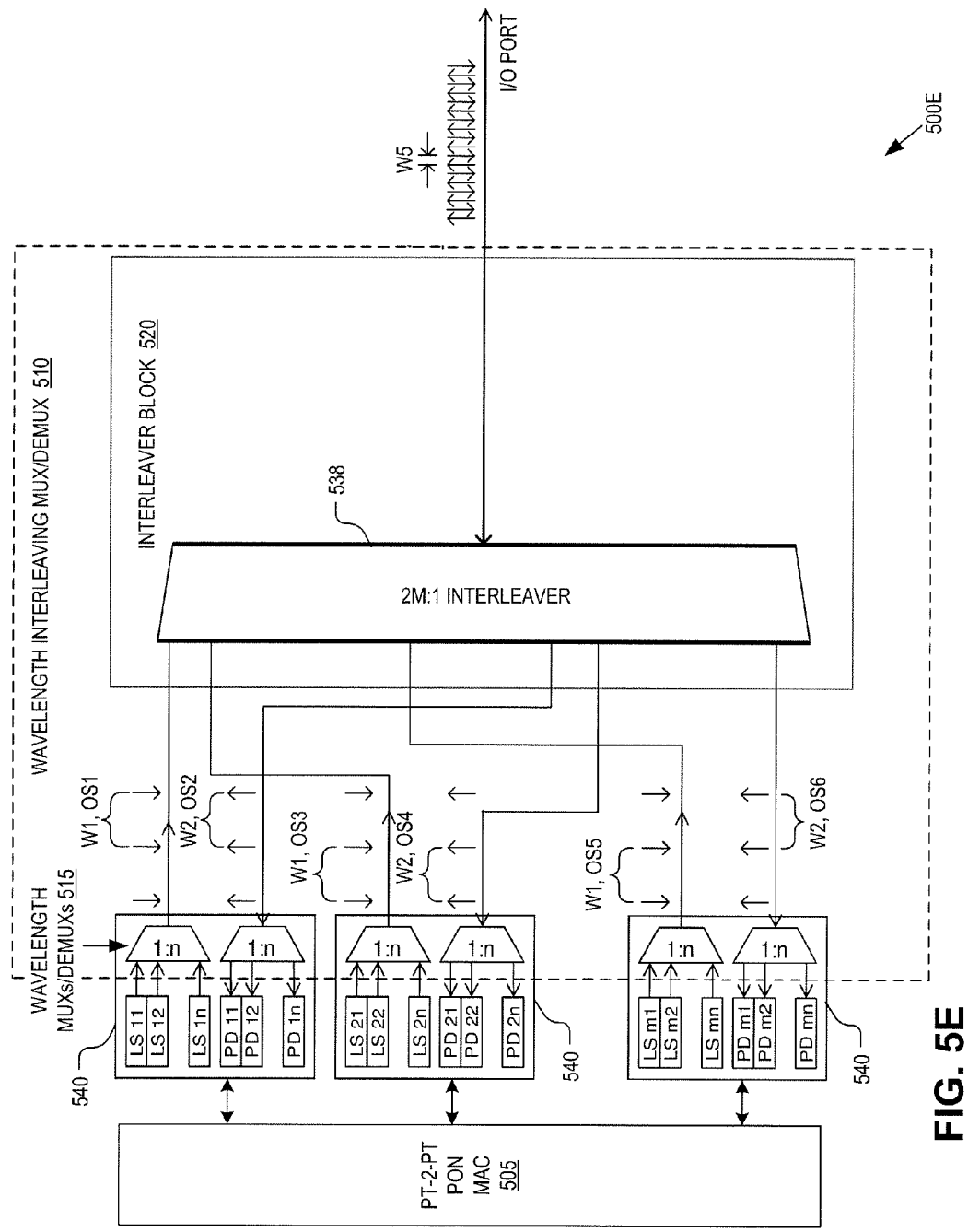

FIG. 5E is a functional block diagram illustrating a WDM OLT 500E, in accordance with an implementation of the disclosure. WDM OLT 500E is one possible implementation of WDM OLT 155 illustrated in FIG. 1. WDM OLT 500E is similar to WDM OLT 500A, except that the two stages of interleaving (M:1 and 2:1) are collapsed into a single stage 2M:1 interleaver 538. 2M:1 interleaver 538 includes M input ports each coupled to one of the DWDM transceiver modules 540 to receive downstream wavelengths, M output ports each coupled to one of the DWDM transceiver modules 540 to output upstream wavelengths, and a single I/O port facing the customer premises.

Figure 5F:
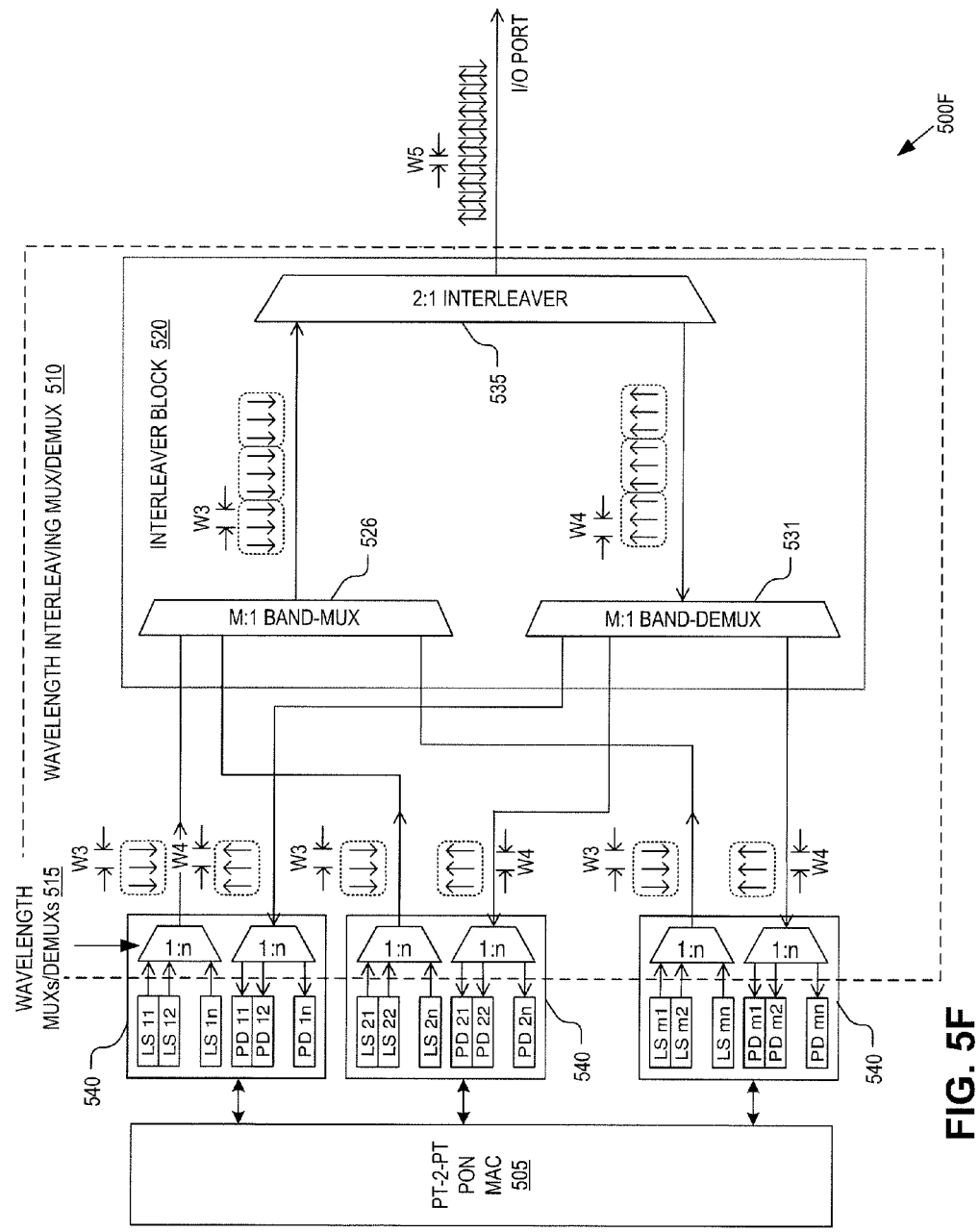

FIG. 5F is a functional block diagram illustrating a WDM OLT 500F, in accordance with an implementation of the disclosure. WDM OLT 500F is one possible implementation of WDM OLT 155 illustrated in FIG. 1. WDM OLT 500F is similar to WDM OLT 500A, except that interleaver block 520 includes an M:1 band-MUX 526 replacing M:1 interleaver 525 and an M:1 band-DEMUX 531 replacing M:1 de-interleaver 530. M:1 band-MUX 526 operates to multiplex groups or bands of contiguous downstream wavelengths at the same channel spacing as output by the LS arrays. However, 2:1 interleaver 535 interleaves the upstream and downstream wavelengths on I/O port, such that channel spacing W5 is approximately half the channels spacings W3 and W4. Note, in some implementations, 2:1 interleaver 535 may be replaced by optical circulator 536 or power coupler 537, as in FIG. 5C and FIG. 5D, respectively.

Figure 6:
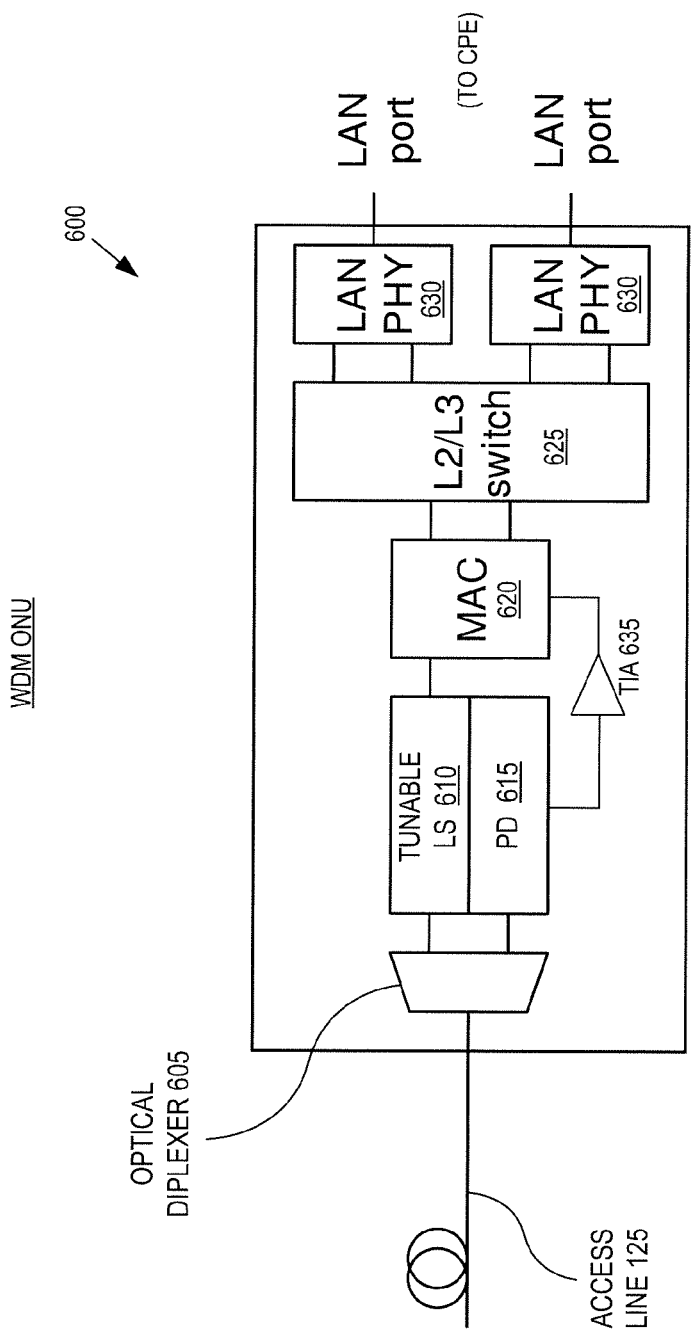
FIG. 6 is a functional block diagram illustrating a WDM optical network unit of a hybrid PON using a comb filter, in accordance with an implementation of the disclosure.

FIG. 6 is a functional block diagram illustrating a WDM ONU 600, in accordance with an implementation of the disclosure. WDM ONU 600 is one possible implementation of WDM ONU 145 illustrated in FIG. 1. The illustrated implementation of WDM ONU 600 includes an optical diplexer 605, a tunable laser source (LS) 610, a broadband photodetector (PD) 615, trans-impedance amplifier (TIA) 635, a MAC 620, a switch 625, and one or more physical interfaces ("PHYs") 630.

Since each WDM ONU 145 in a WDM-PON operates on a different wavelength, it is desirable to have a colorless (i.e., wavelength or color agnostic) ONU. Accordingly, WDM ONU 600 achieves this using tunable LS 610 (e.g., tunable laser diode). The upstream and downstream WDM signals are separated with optical diplexer 605 so that downstream WDM signals are routed to PD 615 while upstream WDM signals 610 output from tunable LS 610 are routed onto access line 125. In one implementation, optical diplexer 605 is implemented using a cyclic comb filter of cyclical interleaver with a FSR between each finger of the comb filter matching the grid spacing of transmitter and receiver—WDM-PON wavelength grid 220 (e.g., W5 in FIG. 5). Of course, other passive or active optical elements may also be used to implement optical diplexer 605 (e.g., an optical circulator, coupler, etc.).

Figure 7:
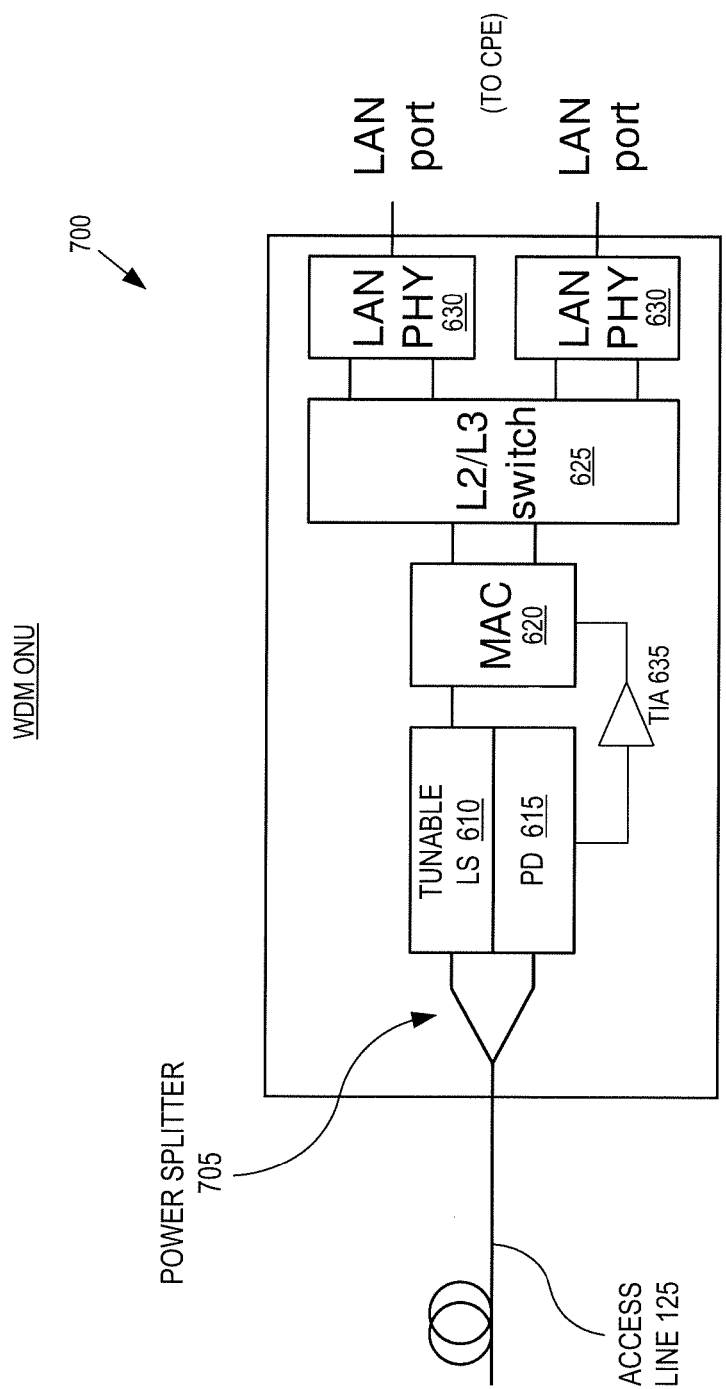
FIG. 7 is a functional block diagram illustrating a WDM optical network unit of a hybrid PON using a power splitter, in accordance with an implementation of the disclosure.

FIG. 7 is a functional block diagram illustrating a WDM ONU 700, in accordance with an implementation of the disclosure. WDM ONU 700 is one possible implementation of WDM ONU 145 illustrated in FIG. 1. WDM ONU 700 is similar to WDM ONU 600, except that optical diplexer 605 is implemented as a directional 3-dB optical power coupler 705, instead of as a comb filter. A 3-dB coupler may incur more losses than an optical diplexer, but is low cost and wavelength agnostic.

Figure 8:
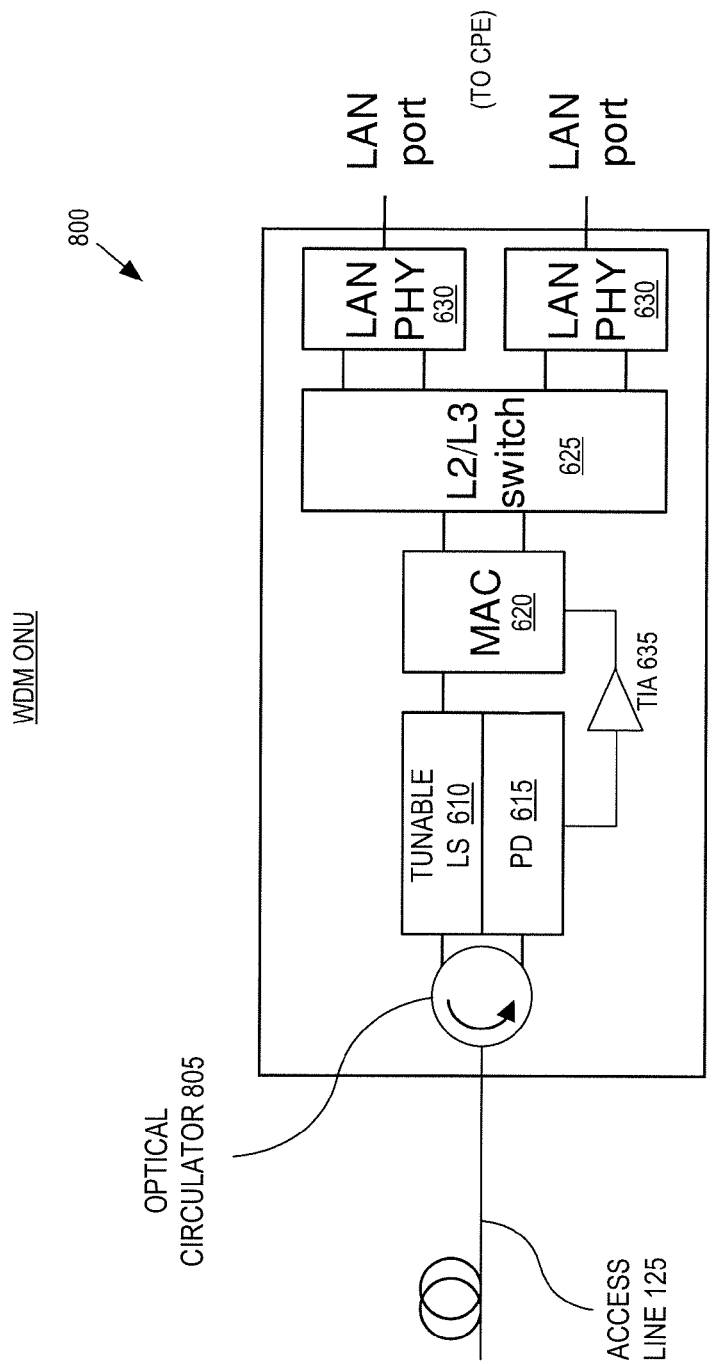
FIG. 8 is a functional block diagram illustrating a WDM optical network unit of a hybrid PON using an optical circulator, in accordance with an implementation of the disclosure.

FIG. 8 is a functional block diagram illustrating a WDM ONU 800, in accordance with an implementation of the disclosure. WDM ONU 800 is one possible implementation of WDM ONU 145 illustrated in FIG. 1. WDM ONU 800 is similar to WDM ONU 600, except that optical diplexer 605 is implemented as a broadband 3-port optical circulator 805, instead of as a comb filter. An optical circulator has the advantage of being low loss over wide wavelength range. It can also function as an isolator to reject back reflections into tunable LS 610, which can simplify the tunable laser design.

The above description of illustrated implementations of the invention, including what is described in the Abstract, is not intended to be exhaustive or to limit the invention to the precise forms disclosed. While specific implementations of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific implementations disclosed in the specification. Rather, the scope of the invention is to be determined entirely by the following claims, which are to be construed in accordance with established doctrines of claim interpretation.

What is claimed is:

1. A hybrid passive optical network ("PON"), comprising:
   a time-division multiplexing ("TDM") optical line terminal ("OLT") for delivering communication services to a first group of customer premises ("CPs") via TDM signals;
   a wavelength-division multiplexing ("WDM") OLT for delivering the communication services to a second group of CPs via WDM signals;
   a remote node power splitter coupled to receive the TDM signals and the WDM signals and to broadcast both the TDM signals and the WDM signals on all ports of the remote node power splitter facing towards the first and second groups of CPs; and
   optical filters each disposed between the remote node power splitter and a corresponding one of the second group of CPs, each of the optical filters configured to pass a sub-group of the WDM signals while blocking other WDM signals such that each of the second group of CPs receives its own allocation of the WDM signals but does not receive the WDM signals allocated to other CPs of the second group of CPs.

2. The hybrid PON of claim 1, further comprising:
   an optical combiner having a first optical port coupled to the TDM OLT, a second optical port coupled to the WDM OLT, and a third optical port, the optical combiner configured to combine the TDM signals and the WDM signals onto the third optical port in a downstream direction and to separate the TDM and WDM signals to the first and second optical ports, respectively, in an upstream direction; and
   a trunk line coupled between the third optical port and the remote node power splitter.

3. The hybrid PON of claim 1, wherein the remote node power splitter comprises a 2:N power splitter having two upstream ports and N downstream ports facing the first and second groups of CPs, and further comprising:
   a first trunk line coupling the TDM OLT to a first upstream port of the 2:N power splitter to carry the TDM signals; and a second trunk line coupling the WDM OLT to a second upstream port of the 2:N power splitter to carry the WDM signals.

4. The hybrid PON of claim 1, wherein the WDM OLT comprises:
an integrated array of laser sources to generate downstream WDM signals having downstream carrier wavelengths of a WDM passive optical network ("PON") wavelength grid;
an integrated array of photo-detectors to receive upstream WDM signals having upstream carrier wavelengths of the WDM PON wavelength grid; and
a wavelength interleaving multiplexer/demultiplexer coupled to the array of laser sources and the array of photo-detectors to interleave the downstream WDM signals with the upstream WDM signals such that consecutive communication wavelengths of the WDM PON wavelength grid are alternately assigned between the downstream and upstream WDM signals and each of the second group of CPs is assigned adjacent ones of the communication wavelengths.

5. The hybrid PON of claim 4, wherein the wavelength interleaving multiplexer/demultiplexer comprises:
downstream wavelength multiplexers each coupled to a different sub-group of the array of laser sources;
upstream wavelength de-multiplexers each coupled to a different sub-group of the photo-detectors; and
an interleaver block coupled between an input/output ("I/O") port of the WDM OLT and both the downstream wavelength multiplexers and the upstream wavelength de-multiplexers.

6. The hybrid PON of claim 5, wherein the interleaver block comprises:
a M:1 interleaver having M input ports coupled to M downstream wavelength multiplexers;
a M:1 de-interleaver having M output ports coupled to M upstream wavelength de-multiplexers; and
a 2:1 interleaver coupling the M:1 interleaver and the M:1 de-interleaver to the I/O port of the WDM OLT.

7. The hybrid PON of claim 1, wherein the WDM OLT comprises:
a first array of laser sources coupled to a first wavelength multiplexer, the first array of laser sources configured to generate a first portion of downstream carrier wavelengths of the WDM signals having a first wavelength spacing that is greater than a second wavelength spacing of the downstream carrier wavelengths of a WDM-PON wavelength grid;
a second array of laser sources coupled to a second wavelength multiplexer, the second array of laser sources configured to generate a second portion of the downstream carrier wavelengths of the WDM signals also having the first wavelength spacing but offset relative to the first portion of the downstream carrier wavelengths; and
an interleaver block coupled to the first and second wavelength multiplexers to interleave the WDM signals to provide the second wavelength spacing of the downstream carrier wavelengths of the WDM-PON wavelength grid.

8. The hybrid PON of claim 1, further comprising:
TDM optical network units ("ONUs") disposed at the first group of CPs to convert the TDM signals between an optical realm and an electrical realm; and
WDM ONUs disposed at the second group of the CPs to convert the WDM signals between the optical and electrical realms.

9. The hybrid PON of claim 8, wherein the WDM ONUs comprise:
an optical diplexer having an upstream port and first and second downstream ports;
a photo-detector coupled to the first downstream port of the optical diplexer, the photo-detector being a broadband photo-detector capable of receiving any downstream wavelength of the WDM signals;
a tunable laser source coupled to the second downstream port of the optical diplexer, the tunable laser source tunable to output upstream WDM signals with a selected upstream wavelength; and
a media access controller coupled to the photo-detector and the tunable laser source.

10. The hybrid PON of claim 9, wherein the optical diplexer comprises a cyclical diplexer having a comb interleaver filter function that aligns with spacings between the upstream and downstream wavelengths of a WDM PON of the hybrid PON.

11. A system for use with a passive optical network ("PON"), the system comprising:
an array of laser sources to generate downstream wavelength division multiplexing ("WDM") signals having downstream carrier wavelengths of a WDM-PON wavelength grid;
an array of photo-detectors to receive upstream WDM signals having upstream carrier wavelengths of the WDM-PON wavelength grid; and
a wavelength interleaving multiplexer/demultiplexer coupled to the array of laser sources and the array of photo-detectors to interleave the downstream WDM signals with the upstream WDM signals such that consecutive communication wavelengths of the WDM-PON wavelength grid are alternately assigned between the downstream and upstream WDM signals,
wherein the array of laser sources, the array of photo-detectors, and the wavelength interleaving multiplexer/demultiplexer are components of a WDM optical line terminal ("OLT") for delivering communication services to a first group of customer premises ("CPs") via WDM signals.

12. The system of claim 11, wherein the wavelength interleaving multiplexer/demultiplexer comprises:
downstream wavelength multiplexers each coupled to a different integrated sub-group of the array of laser sources;
upstream wavelength de-multiplexers each coupled to a different integrated sub-group of the photo-detectors; and
an interleaver block coupled between an input/output ("I/O") port of the WDM OLT and both the downstream wavelength multiplexers and the upstream wavelength de-multiplexers.

13. The system of claim 12, wherein the interleaver block comprises:
a M:1 interleaver having M input ports coupled to M downstream wavelength multiplexers;
a M:1 de-interleaver having M output ports coupled to M upstream wavelength de-multiplexers; and
a 2:1 interleaver coupling the M:1 interleaver and the M:1 de-interleaver to the I/O port of the WDM OLT.

14. The system of claim 13, wherein the interleaver block further comprises at least one of:
a first Erbium Doped Fiber Amplifier ("EDFA") coupled between the M:1 interleaver and the 2:1 interleaver to amplify the downstream WDM signals; or a second EDFA coupled between the 2:1 interleaver and the M:1 de-interleaver to amplifier the upstream WDM signals.

15. The system of claim 12, wherein the interleaver block comprises:
an M:1 interleaver having M input ports coupled to M downstream wavelength multiplexers;
an M:1 de-interleaver having M output ports coupled to M upstream wavelength de-multiplexers; and
an optical circulator coupling the M:1 interleaver and the M:1 de-interleaver to the I/O port of the WDM OLT.

16. The system of claim 12, wherein the interleaver block comprises:
an M:1 interleaver having M input ports coupled to M downstream wavelength multiplexers;
an M:1 de-interleaver having M output ports coupled to M upstream wavelength de-multiplexers; and
an optical power splitter coupling the M:1 interleaver and the M:1 de-interleaver to the I/O port of the WDM OLT.

17. The system of claim 12, wherein the interleaver block comprises a 2M:1 interleaver.

18. The system of claim 12, wherein the interleaver block comprises:
an M:1 band-MUX having M input ports coupled to M downstream wavelength multiplexers;
an M:1 band-DEMUX having M output ports coupled to M upstream wavelength de-multiplexers; and
a 2:1 interleaver coupling the M:1 band-MUX and the M:1 band-DEMUX to the I/O port of the WDM OLT.

19. The system of claim 12, wherein each integrated sub-group of the array of laser sources coupled to a given downstream wavelength multiplexer generates a portion of the downstream carrier wavelengths having a first wavelength spacing that is greater than a second wavelength spacing of the downstream carrier wavelengths of the WDM PON wavelength grid and wherein the interleaver block is coupled to combine the downstream carrier wavelengths from the integrated sub-groups of the array of laser sources to provide the second wavelength spacing of the downstream carrier wavelengths of the WDM PON wavelength grid.

20. The system of claim 11, wherein the PON comprises a hybrid-PON, the system further comprising:
a time-division multiplexing ("TDM") optical line terminal ("OLT") for delivering the communication services to a second group of CPs via TDM signals;
a remote node power splitter coupled to receive the TDM signals and the WDM signals and broadcast both the TDM signals and the WDM signals on all ports of the remote node power splitter facing towards the first and second groups of CPs; and
optical filters each disposed between the remote node power splitter and a corresponding one of the first group of CPs, each of the optical filters are configured to pass a sub-group of the WDM signals while blocking other WDM signals such that each of the first group of CPs receives its own allocation of the WDM signals but does not receive the WDM signals allocated to other CPs of the first group of CPs.

21. The hybrid PON of claim 20, further comprising:
an optical combiner having a first optical port coupled to the TDM OLT, a second optical port coupled to the WDM OLT, and a third optical port, the optical combiner configured to combine the TDM signals and the WDM signals onto the third optical port in a downstream direction and to separate the TDM and WDM signals to the first and second optical ports, respectively, in an upstream direction; and
a trunk line coupled between the third optical port and the remote node power splitter.

22. The hybrid PON of claim 20, wherein the remote node power splitter comprises a 2:N power splitter having two upstream ports and N downstream ports facing the first and second groups of CPs, and further comprising:
a first trunk line coupling the TDM OLT to a first upstream port of the 2:N power splitter to carry the TDM signals; and
second trunk line coupling the WDM OLT to a second upstream port of the 2:N power splitter to carry the WDM signals.

23. A method of migrating from time-division multiplexing ("TDM") to wavelength-division multiplexing ("WDM") within a hybrid passive optical network ("PON"), the method comprising:
initially providing customer premises ("CPs") communication services via a TDM optical line terminal ("OLT") using TDM signals broadcast onto the hybrid PON;
selecting a given CP to migrate from the TDM to the WDM using WDM signals;
delivering the TDM signals and the WDM signals to a remote node power splitter;
broadcasting both the TDM signals and the WDM signals on all ports of the remote node power splitter facing towards the CPs including a given CP; and
providing an optical filter disposed between the remote node power splitter and the given CP migrating to the WDM, the optical filter configured to pass the WDM signals associated with the given CP while blocking other WDM signals associated with other CP using WDM.

24. The method of claim 23, further comprising:
adding additional WDM CPs on a rolling basis; and
providing additional optical filters disposed between the remote node power splitter and the additional WDM CPs migrating to the WDM, each of the additional optical filters configured to pass a different sub-group of the WDM signals while blocking other WDM signals such that each of the additional WDM CPs receives its own allocation of the WDM signals but does not receive the WDM signals allocated to others.

25. The method of claim 24, further comprising swapping an existing TDM optical network unit ("ONU") at the given CP for a WDM ONU upon migrating the given CP from the TDM to the WDM.

* * * * *